May 21, 1929.  L. E. WHITON  1,713,796
CHUCK
Filed Oct. 8, 1925   4 Sheets-Sheet 3

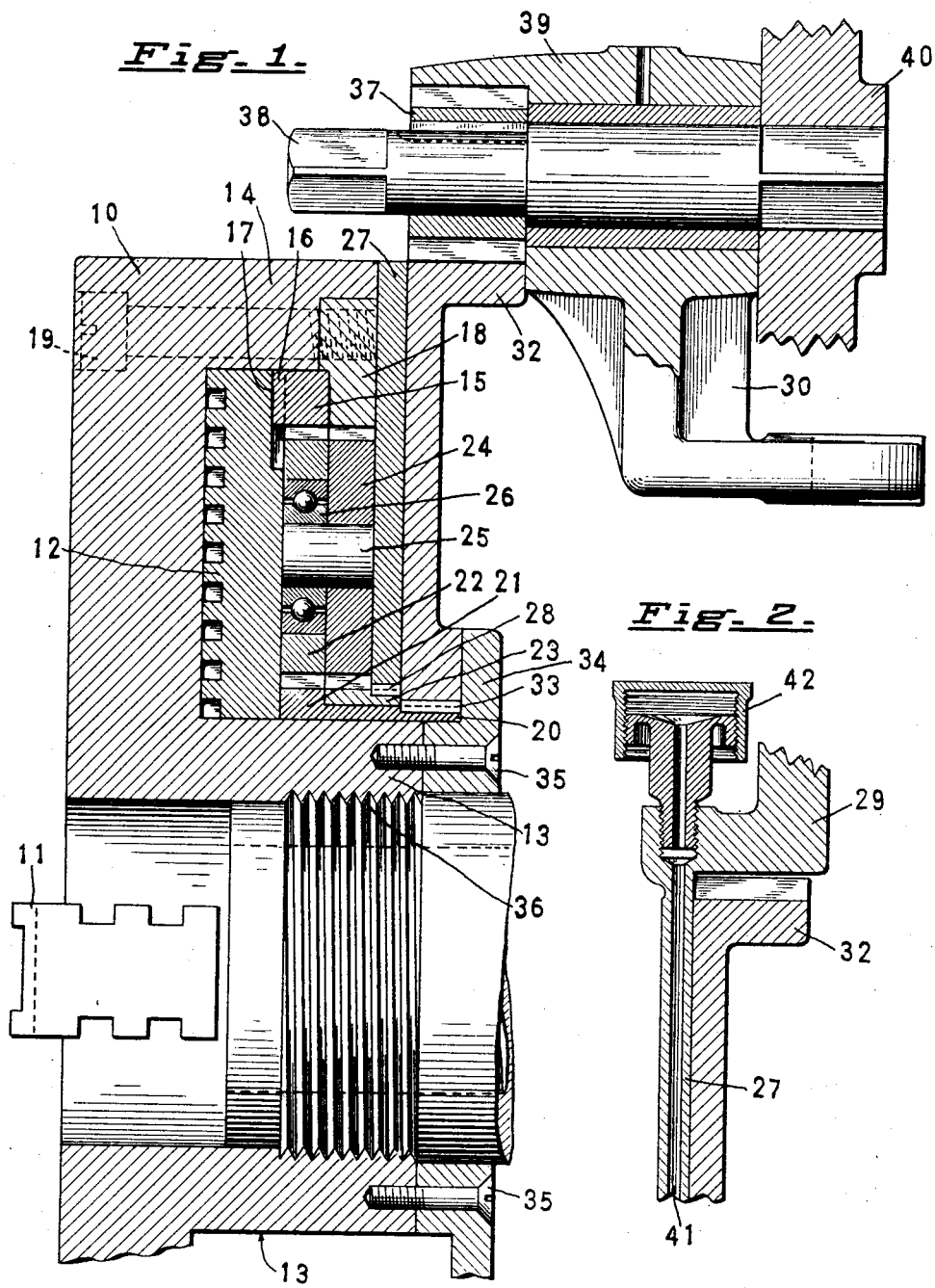

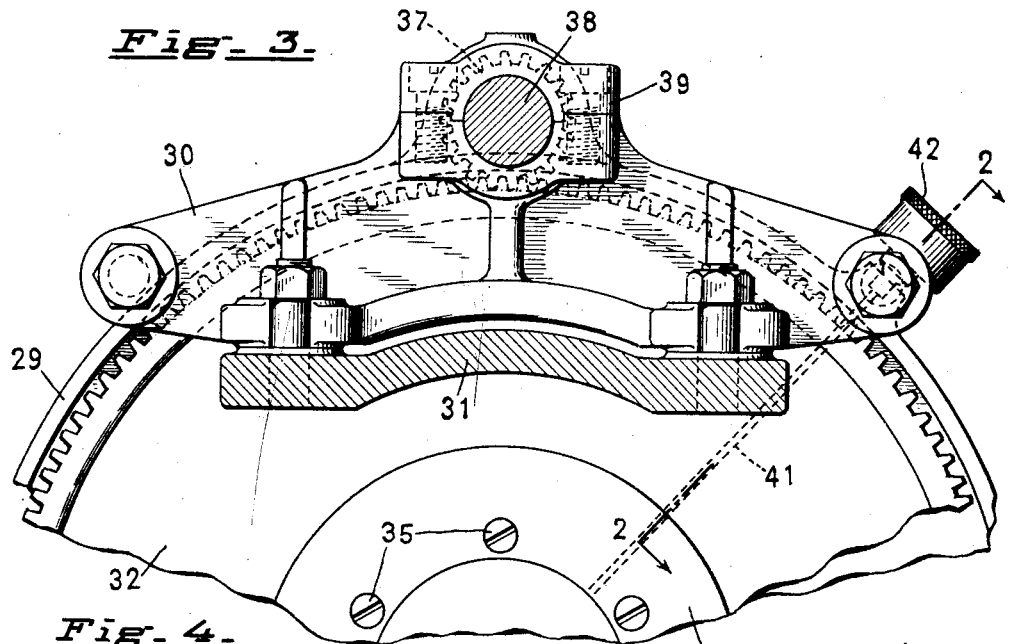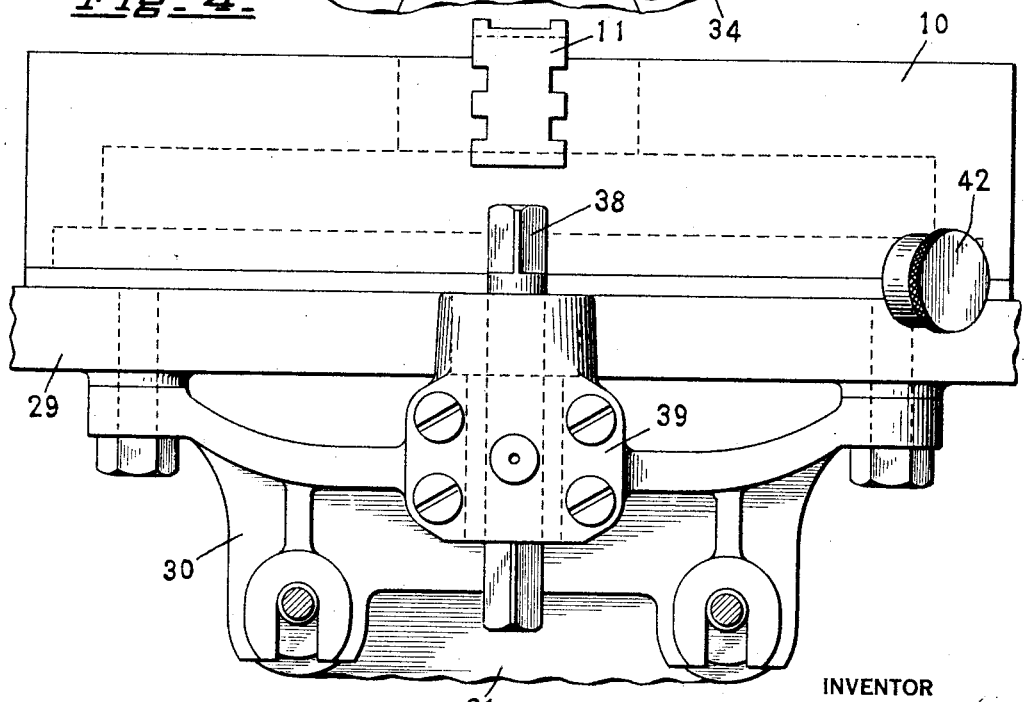

INVENTOR
Lucius E. Whiton,
BY
ATTORNEY

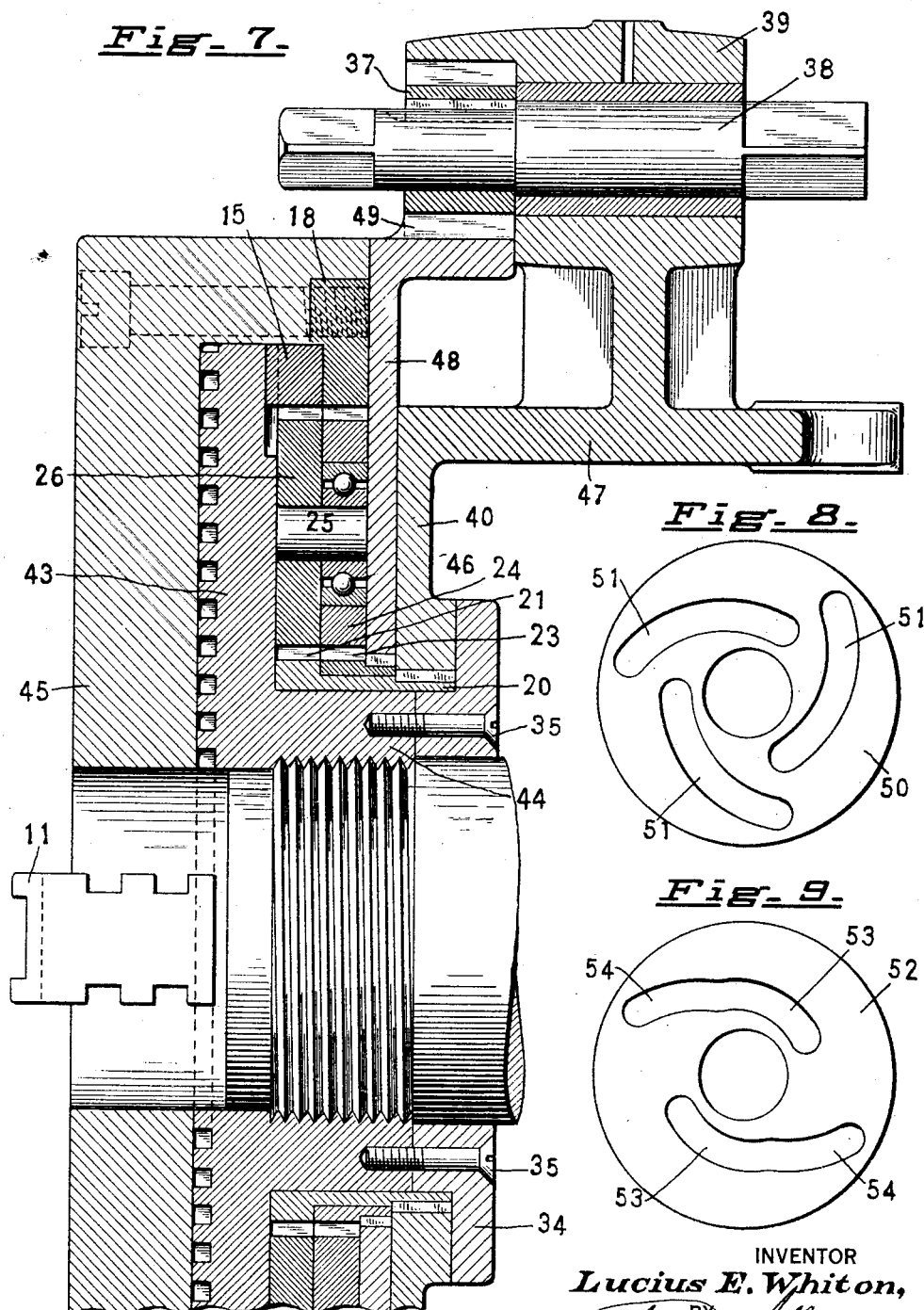

Patented May 21, 1929.

1,713,796

UNITED STATES PATENT OFFICE.

LUCIUS E. WHITON, OF NEW LONDON, CONNECTICUT.

CHUCK.

Application filed October 8, 1925. Serial No. 61,173.

My invention relates particularly to lathe chucks.

One object is to provide a simple, compact, and reliable mechanism by means of which the jaws may be moved to grasp or release the work regardless of whether the chuck is stationary or rotating.

Another object is to provide mechanism of this character in which the jaws may be moved in or out to substantially the full extent permitted by the design of the chuck.

Another object is to provide a chuck of this character which may be adjusted by hand or by power.

Another object is to provide a construction of this character which may be readily embodied in a chuck having the usual type of scroll plate.

Another object is to provide an automatic or semi-automatic chuck which can handle bar stock fed through the spindle.

In the accompanying drawings I have illustrated some of the forms which my invention may take. The details of construction will be understood from the consideration of the following specification.

Fig. 1 is a fragmentary, longitudinal, vertical, sectional view showing one form of construction embodying my invention.

Fig. 2 is a fragmentary sectional view showing one means for lubricating the moving parts of the chuck.

Fig. 3 is a fragmentary rear-end view and partial section showing the method of supporting parts of the chuck.

Fig. 4 is a plan view of the same parts.

Fig. 7 is a longitudinal, vertical, sectional view showing my invention applied to a self tightening chuck.

Figs. 8 and 9 are views of different forms of jaw operating plates.

Figure 5:
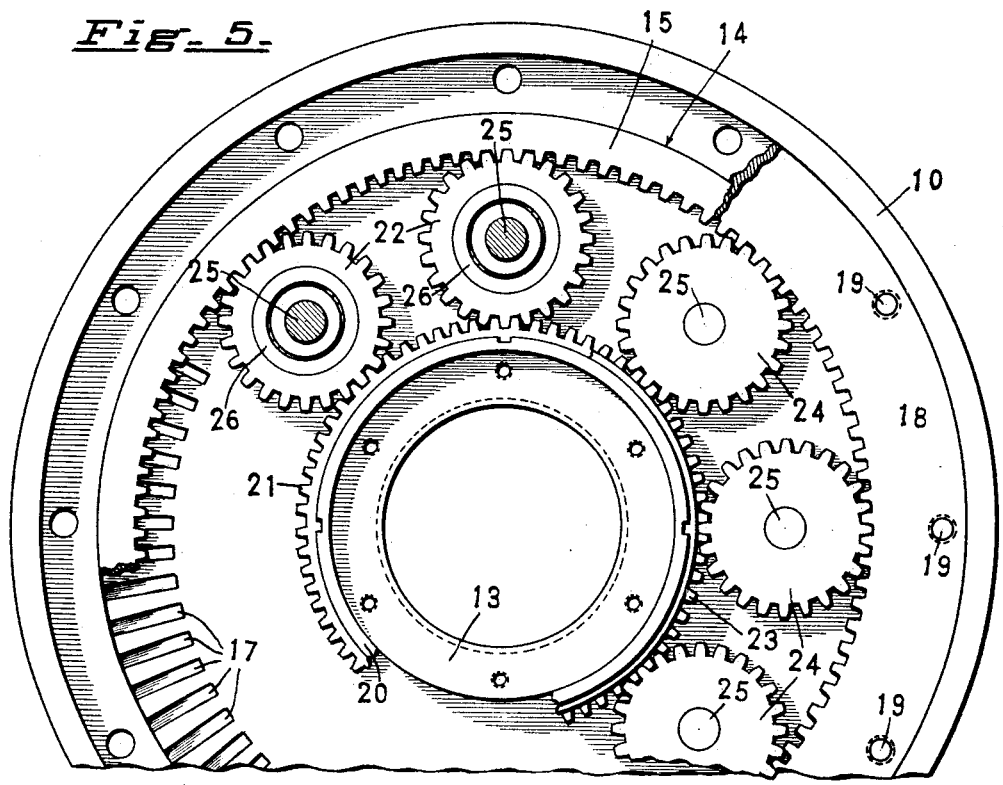
Fig. 5 is a fragmentary rear view showing parts of the chuck mechanism.
Figure 6:
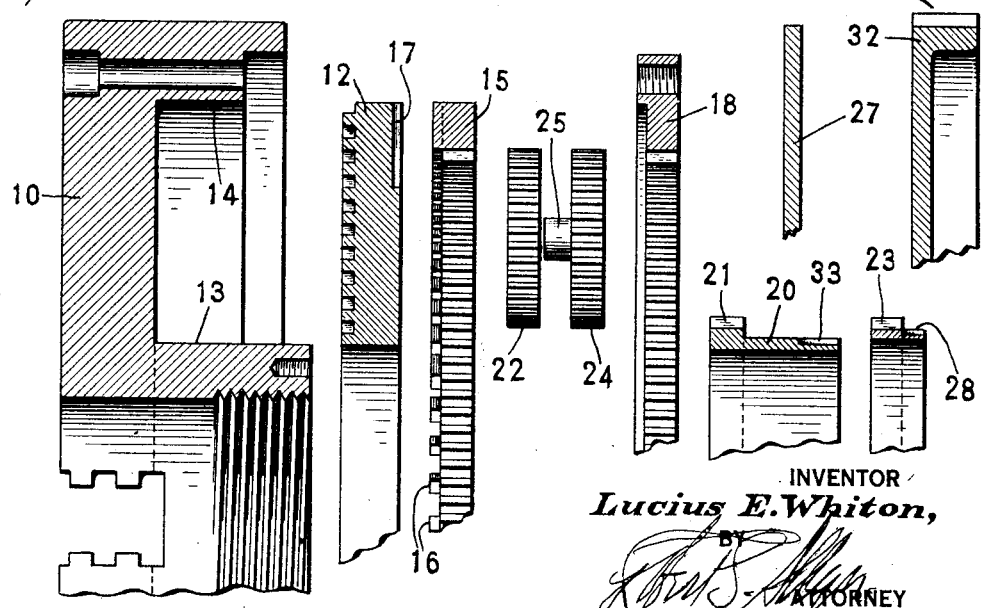
Fig. 6 is a fragmentary, longitudinal, sectional view showing various parts of the chuck mechanism of Figs. 1 to 5.

In the form shown in Figs. 1 to 6 the chuck body 10 carries a plurality of jaws 11 which are adjusted in and out by a scroll plate 12 located in the back of the body around the hub 13 and within the flange 14.

The annular gear or ring 15, having internal teeth, is mounted so as to rotate with the scroll plate. In the form shown the coupling between the gear ring 15 and the scroll plate is effected by means of interlocking clutch teeth or lugs 16 and 17.

Another gear ring or annulus 18, having teeth corresponding with the teeth in the gear 15, is secured in the rear of the chuck body by a plurality of fastening screws 19. This gear 18 over-laps gear 15 and holds it and the scroll plate 12 in place in the process of assembly. It will be understood, of course, that the scroll plate and the gear 15 fit smoothly within the chuck body and are free to rotate with respect to the chuck body and the gear ring 18.

The sleeve 20 is mounted on the hub 13 in the rear of the scroll plate 12 and provided with gear teeth 21 in the same plane and opposite the teeth on gear 15. Between the annular gear 15 and the gear 21 I mount a series of pinions such as 22, the operation of which will be understood hereinafter.

The gear ring 23 having external teeth is mounted on the sleeve 20 adjacent the gear 21, leaving sufficient clearance for freedom of movement between the gears 21 and 23. Between the gears 18 and 23 I mount a series of pinions 24 corresponding to the pinions 22. These pinions 22 and 24 are secured together in pairs by short studs or shafts 25, the length of which is equal to the combined thickness of pinions 22 and 24. Either or both of the pinions 22 and 24 may be provided with ball-bearings if desired. I have shown a typical ball-bearing ring 26 for supporting the pinion 22 on the shaft 25.

The plate 27 closes the back of the chuck body and is fixed or supported by some relatively stationary element of the machine. It is keyed at 28 to the gear ring 23. The plate 27 has a flange 29 and is supported by a bracket 30 which is secured to a stationary part 31 of the lathe head.

The variator gear plate or disc 32 is keyed at 33 to the sleeve 20 of the gear 21 and mounted so that it may be rotated relatively to the plate or disc 27. The washer ring 34 is secured to the chuck body by screws 35 and holds the chuck body and gear 32 together. The flange 29 covers the teeth of gear 32.

The chuck body may have screw threads to attach it to a lathe spindle 36. Pinion 37 on shaft 38 meshes with gear 32 and is protected by bearing cap 39. A power-driven member 40 may be mounted on one end of shaft 38. The other end may be engaged by any ordinary hand wrench, etc.

The plate 27 may have an oil or grease passage 41 extending down into the chuck body to lubricate the gears and pinions. 42 is an oil cup.

Normally the gear 32 and plate 27 and the attached gears 21 and 23 are stationary. The annular gears 15 and 18 revolve with the chuck body and the pinions 22 and 24 travel around freely in the space between the inner and outer gears being guided at their front and rear ends by the plates 27 and 12. As there is no relative movement between gears 15 and 18, the scroll plate rotates with and at the same rate as the chuck body and hence does not move the jaws either in or out.

When the variator 32 is rotated with respect to the disc 27, the gear 21 rotates relative to gear 23 so that pinion 22 must rotate with respect to pinion 24, thus compelling gear 15 and scroll plate 12 to revolve in the chuck body. This of course moves the jaws 11 in or out, depending upon the direction and extent of rotation of the variator gear 32. The mechanism provides a power factor for moving the scroll plate represented by the ratio between the pitch diameter of the pinion 37 and spur gear 32, and the added power factor of the ratio between gear 21 and internal gear 15.

To separate the parts the ring 34 is removed so as to permit the chuck body to be moved forwardly free from the plate 27. The pinions 22 and 24 and the gears 23 and 21 may then be removed. When the gear 18 is removed, the gear 15 is free to come out and then the scroll plate 12. Assembly can be effected in the reverse order.

It will be seen from the above that the movement of spur gear 32 causes the revolution of the scroll plate 12, regardless of whether the chuck body 10 is revolving with the lathe spindle or is stationary.

By the application of power at the end of shaft 38 the chuck may be made a power actuated chuck which will open or close without stopping the lathe, if the work justifies this practice, or with the chuck body and lathe spindle stationary if the weight of the work is such as to make it advisable to stop the chuck body while the work is being gripped or released.

It is an important feature that the mechanism described affords means of actuating the chuck jaws through a wide radial adjustment so that the chuck will hold any work within its capacity and that the mechanism will actuate the jaws, either inwardly or outwardly, as may be required, to grasp the work either by contracting the jaws inwardly on the outside of the piece to be held, or expanding them outwardly on the inside of the piece.

It will be seen that this arrangement leaves the center entirely unobstructed so that bar stock may be readily fed through the hollow spindle. It also permits the use of back-feeding tools controlled by suitable tool bars (not shown) through the spindle.

It will be seen that this construction is very simple in its detail and in its method of assembly. It is so compact that the chuck takes up practically no more room than an ordinary hand-adjustable chuck. It will also be seen that the chuck is susceptible of adjustment by hand as well as by means of a power device such as an electric motor or the like.

Although the gear arrangement is quite simple and compact it is capable of very positive gripping action by reason of the high gear ratios between gears 21 and 15 as well as between 37 and 32.

It should be understood that I anticipate that the principles of this invention may be embodied in many different forms of construction. So far as I know, the idea of mounting the planetary gears or pinions between the relatively stationary support and the rotating part of a chuck so that they require no bearing frame or spider, is entirely novel. Actual construction and operation of structures of this character have demonstrated the entire practicability of this arrangement.

In Fig. 7 I have illustrated the principles of the invention as applied to what is sometimes called a self tightening chuck. In this case, similar reference numbers are applied to parts which correspond to those shown in the form of Fig. 1. The cam or scroll plate 43 has a hub 44 which is adapted to be secured to the lathe spindle so that the driving of the chuck is effected through the scroll plate instead of from the chuck body 45. The jaws 11 are guided in the chuck body and connected to the scroll plate in the usual manner.

The annular gears 15 and 18 are mounted in the same way as the corresponding gears heretofore described. In this case the spur gears 21 and 23 are similar to those previously described but the sleeve 20 carrying the gear 21 and supporting the gear 23 is mounted on the hub 44 of the scroll plate instead of on the hub of the chuck body. In this case I have shown the pinion 24 mounted on a ball bearing 46 on the shaft 25 which carries the pinion 26. The relatively stationary member 47 has a disc 40 which is keyed to the sleeve 20 so that the sleeve 20 and gear 21 are stationary. The variator 48 is keyed to the gear 23 and has teeth 49 meshing with the pinion 37 on the shaft 38 so that it may be driven by hand or power as desired.

In the normal use of the chuck the variator gear member 48 and the disc 40 are both stationary so that both the gears 21 and 23 are stationary. As the scroll plate 43 is rotated by the spindle the annular gear 15 of course rotates with it. This causes the pinions 26 to travel around the gear 21 which is relatively stationary and carries the pinions 24 which drive the chuck body at the same speed as to scroll plate. As the power is being applied through the scroll plate however and the work is carried by the jaws in the body the tendency of the scroll plate is to tighten the jaws upon the work thus preventing the jaws from becoming loosened.

In other words the chuck is self-tightening. When it is desired to operate the jaws it is simply necessary to turn the shaft 38 and rotate the variator 48 more or less depending upon the extent of movement of the jaws desired. It will be seen however that this construction has the same advantage of compactness and simplicity as the construction heretofore described. The self tightening feature is of course dependent upon the direction of the spiral in the scroll thread. A chuck can therefore only be self tightening inwardly or outwardly with respect to the work dependent upon the direction of the spiral groove in the scroll plate. The same construction is applicable however to both expanding and contracting jaws, it merely being necessary to use a cam or scroll plate having the desired thread so as to open or close the jaws as desired.

In Fig. 8 I have shown another form of cam plate 50 to take the place of the scroll plate. In this case the cam plate is provided with grooves 51 corresponding in number to the number of jaws of the chuck. Each chuck jaw would have a projection extending into a groove 51. The grooves are designed to give a rapid radial travel of the jaws. The shape of the cam grooves will depend upon whether the rate of motion of the jaws is to be rapid near the center or near the circumference.

Fig. 9 shows another cam plate 52 designed to operate the jaws of a two jaw chuck. The grooves of such a cam would be designed to correspond with the character of motion which it is desired that the jaw should have. I have shown the inner part 53 of the cam groove with a slow increase or rise and the outer end 54 with a rapid rise.

It should be understood that other modifications and substitutions may be made within the scope of the claims hereinafter set forth.

I claim:

1. An automatic chuck comprising a body, a cam plate mounted to rotate therein, jaws connected to said plate, an annular gear secured to said cam plate, a gear rotatable on said body, a series of pinions interposed between said gears, an annular gear connected to said body, a stationary gear, a plate supporting said latter gear, a series of pinions interposed between said two last-mentioned gears, a series of shafts connecting the pinions of the two series guided between said stationary plate and said cam plate, and means for rotating said second mentioned gear.

2. A chuck comprising a body having a recess, a scroll plate mounted to rotate therein, jaws connected to said plate, an annular gear connected to said scroll plate, a smaller gear rotatable in said body recess, a series of pinions interposed between said gears, an annular gear secured to said body, a smaller stationary gear, a plate supporting said latter gear, a series of pinions interposed between said two last-mentioned gears, and connected to the first mentioned pinions and a gear for rotating said second-mentioned gear.

3. A chuck comprising a body, a cam member mounted to rotate therein, jaws connected to said member, an annular gear having a toothed connection with said cam member, a spur gear rotatable in said body, a sleeve connected thereto, a series of pinions interposed between said gears, a second annular gear overlapping and holding the first annular gear, screws connecting said second annular gear to said body, a gear mounted on said sleeve, a stationary plate supporting said latter gear, a series of pinions interposed between said two last-mentioned gears, shafts connecting the pinions of the two series guided between said stationary plate and said cam member, and means for rotating said spur gear.

4. A chuck comprising a body having a hub, a cam plate mounted to rotate within said body on said hub, jaws connected to said plate, an annular gear secured to said cam plate, a gear rotatable on said hub, a series of pinions interposed between said gears, an annular gear connected to said body, a spur gear, a stationary plate supporting said latter gear and having a flange, a series of pinions interposed between said two last-mentioned gears, shafts connecting the pinions of the two series guided between said stationary plate and said cam plate, and a gear for rotating said second-mentioned gear and having its teeth housed by the flange of said stationary plate.

5. In a chuck, a body, a scroll plate therein, a stationary plate, a rotatable plate, outer and inner gears secured to said scroll plate and said rotatable plates respectively, a companion gear mounted alongside of each of said outer and inner gears and connected to said body and said stationary plate respectively, pairs of pinions connecting said gears, each pair being mounted on a shaft and guided solely between adjacent surfaces of said scroll plate and said stationary plate and means for rotating said rotatable plate.

6. The combination of two concentrically mounted relatively rotatable members, one of said members having a hub and a flange, annular gears secured to the outer edges of said members, a sleeve mounted on said hub and having a gear within one of said annular gears, a second gear mounted on said sleeve within the other annular gear, a pair of pinions having a common shaft and interposed between said outer and inner gears, a plate for holding one of said inner gears stationary and holding said pinions in place and means for rotating the other inner gear.

7. In an automatic chuck, a body, a jaw operating plate, a stationary plate, a rotatable plate, outer and inner gears secured to two of said plates respectively, a companion gear mounted alongside of each of said outer and inner gears, said companion gears being secured to said body and to the third plate, pairs of pinions connecting said gears, each pair being mounted on a shaft and guided solely between adjacent surfaces of two of said plates and means for rotating one of said gears with respect to its companion gear.

8. A chuck comprising two concentrically mounted relatively rotatable members, two annular gears one of said gears having toothed coupling with one of said members and screws for securing the other gear to the other member, two spur gears arranged inside of said annular gears, pairs of connected pinions meshing with said outer and inner gears, the pinions of each pair being supported independently of the other pairs.

9. The combination of two concentrically mounted relatively rotatable members, one of said members having a hub, an annular gear having a clutch engagement with one of said members, a second annular gear fastened to the other member and overlapping the first gear, a sleeve mounted on said hub and having a gear within one of said annular gears, a second gear mounted within the other annular gear, a pair of pinions having a common shaft and interposed between said outer and inner gears, a plate for holding one of said inner gears stationary and forming a bearing surface for said pinions and for one of said annular gears, and means for rotating the other inner gear.

10. In a construction of the character described, a stationary plate, a rotatable plate, outer and inner gears secured to said plates respectively, a companion gear mounted along side of each of said outer and inner gears, pairs of pinions connecting said gears, each pair being mounted on a shaft and guided solely between adjacent surfaces of said plates and means for rotating one of said gears with respect to its companion gear.

11. A construction of the character described comprising two concentrically mounted relatively rotatable members, two annular gears rotatable with said members and arranged side by side in contact with each other, two spur gears arranged in contact with each other inside of said annular gears, pairs of connected pinions meshing with said outer and inner gears, the pinions of each pair being supported on a shaft in contact with each other and each pair being supported independently of the other pairs.

12. The combination of two concentrically mounted relatively rotatable members, one of said members having a hub, annular gears secured to said members side by side, a sleeve mounted on said hub and having a gear within one of said annular gears, a second gear mounted on said sleeve within the other annular gear, a pair of pinions having a common shaft and interposed between said outer and inner gears, means for holding one of said inner gears stationary and means for rotating the other inner gear.

13. In a chuck a stationary plate, a bracket supporting said plate, a rotatable plate, outer and inner gears secured to said plates respectively, a companion gear mounted along side of each of said outer and inner gears, pairs of pinions connecting said gears, each pair being mounted on a shaft and guided between adjacent surfaces of said plates, a pinion supported by said bracket and a gear driven by said latter pinion for rotating one of said previously mentioned gears with respect to its companion gear.

14. In a chuck the combination of two concentrically mounted relatively rotatable members, one of said members having a hub, annular gears secured to said members side by side, a sleeve mounted on said hub and having a gear within one of said annular gears, a second gear mounted on said sleeve within the other annular gear, a pair of pinions having a common shaft and interposed between said outer and inner gears, a stationary plate for holding one of said inner gears stationary, a bracket for supporting said plate, a gear plate for rotating the other inner gear, and a pinion supported by said bracket for rotating said gear plate.

15. A chuck comprising a body, a jaw operating plate mounted therein, a sleeve mounted concentrically with said body and having gear teeth arranged adjacent said plate, an annular gear connected to the periphery of said plate, a pinion mounted to travel between said gears, a gear ring mounted on said sleeve adjacent the teeth of said sleeve, an annular gear connected to the periphery of said chuck body alongside of the first mentioned annular gear, a pinion interposed between said gear ring and the second mentioned annular gear, a shaft connecting said pinions, a stationary plate connected to said gear ring and forming a backing for one of said pinions and one of said annular gears, and a rotatable plate secured to said sleeve alongside of said stationary plate.

16. A chuck comprising a body, a jaw operating plate mounted therein, a sleeve mounted concentrically with said body and having gear teeth arranged adjacent said plate, an annular gear connected to the periphery of said plate, a pinion mounted to travel between said gears, a gear ring mounted on said sleeve adjacent the teeth of said sleeve, an annular gear connected to the periphery of said chuck body alongside of the first mentioned annular gear, a pinion interposed between said gear ring and the second mentioned annular gear, a shaft connecting said pinions, a stationary plate connected to said gear ring and forming a backing for one of said pinions and one of said annular gears, a rotatable plate secured to said sleeve alongside of said stationary plate, a bracket supporting said stationary plate, a shaft carried by said bracket, and a pinion carried by said shaft for rotating the rotatable plate.

17. A chuck comprising a body, a jaw operating plate coacting therewith, spur gears mounted concentrically with said chuck body, one of said gears being stationary and the other rotatable, annular gears secured respectively to said chuck body and said jaw operating plate, planetary pinions mounted to travel between annular gears and said spur gears, a supporting bracket, a stationary plate secured to said bracket and connected to said stationary gear, a rotatable gear secured to rotate with said rotatable spur gear, and a shaft carried by said bracket and geared to said rotatable gear.

18. Mechanism for transmitting power comprising two discs one of which is rotatable with respect to the other and having bearing surfaces spaced apart from each other, a pair of inner spur gears between said discs with outwardly projecting teeth and a pair of outer annular gears surrounding the spur gears, and having teeth projecting inwardly toward the spur gears, pairs of pinions mounted to travel between the inner and outer gears, each pair of pinions having a common stud shaft, said pinions and shafts being guided and supported by the adjacent surfaces of the two discs, one gear of each pair of gears being respectively connected to rotate with each disc, and relatively stationary and movable members connected to the other gear of each pair.

LUCIUS E. WHITON.